UNITED STATES PATENT OFFICE.

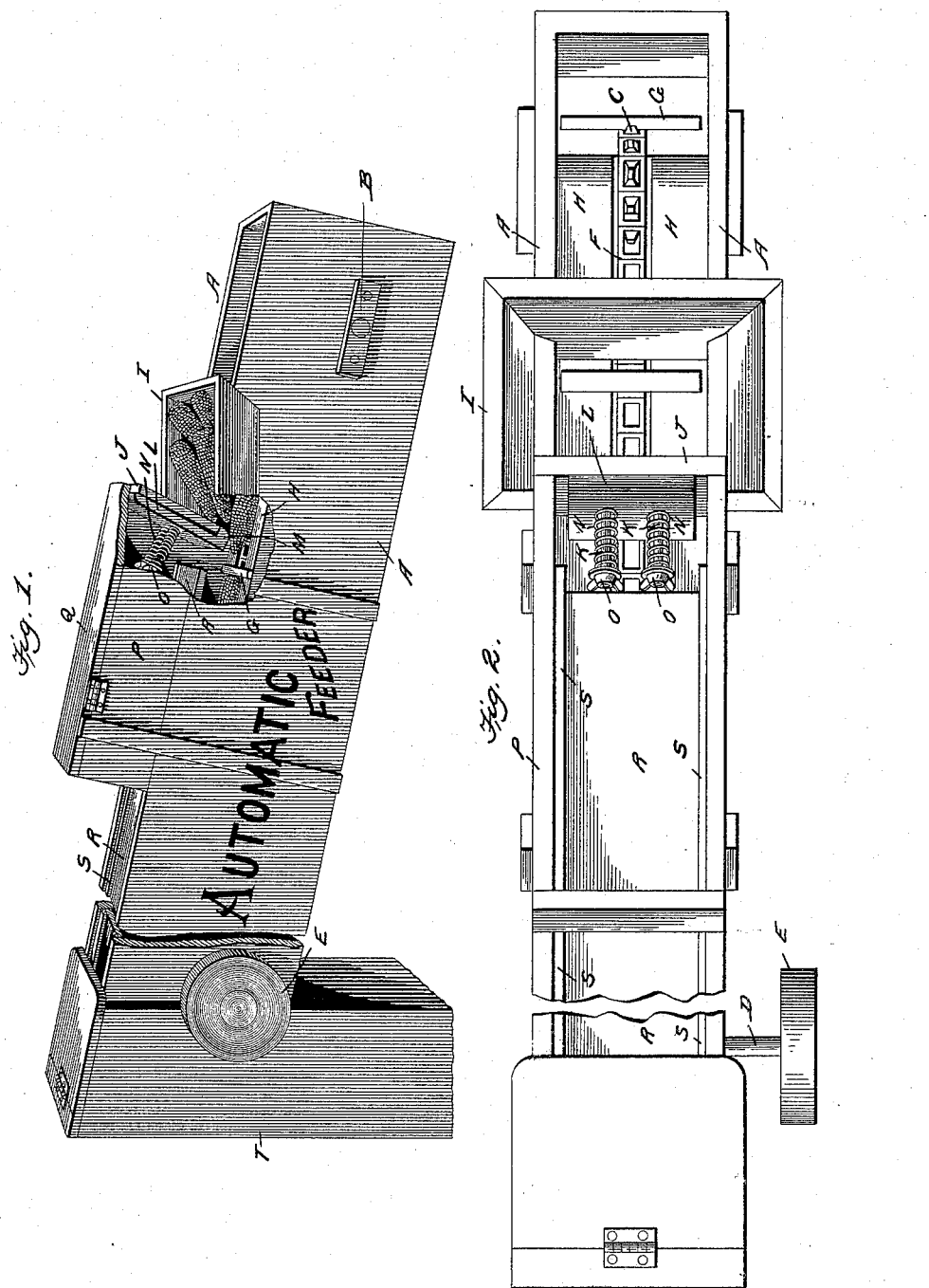

JEREMIAH S. BURKE, OF PEMBERTON, OHIO.

AUTOMATIC EAR-CORN FEEDER AND CONVEYER.

SPECIFICATION forming part of Letters Patent No. 533,160, dated January 29, 1895.

Application filed April 27, 1894. Serial No. 509,181. (No model.)

*To all whom it may concern:*

Be it known that I, JEREMIAH S. BURKE, a citizen of the United States, residing at Pemberton, in the county of Shelby and State of Ohio, have invented certain new and useful Improvements in Automatic Ear-Corn Feeders and Conveyers; and I do hereby declare the following to be a full, clear, and exact description of the invention, such as will enable others skilled in the art to which it appertains to make and use the same.

My invention relates to improvements in ear corn feeders and conveyers, in which there is provided a valve mechanism for automatically regulating the amount of corn to be carried, and causing the ears of corn to assume the right position in the conveyer.

It also relates to the details of construction which will be hereinafter set forth, and particularly pointed out in the claims.

I attain these objects by the mechanism illustrated in the accompanying drawings, which constitute a part of this specification, and in which—

Figure 1 represents a perspective view of the device, having parts broken away to show the details of my improvement. Fig. 2 is a plan view of the device.

The same symbols of reference represent identical parts throughout both views.

A represents an ordinary conveyer case or box and is provided at each end with sprocket wheels, provided with suitable bearings, B, one of said wheels being shown at, C, and the other, not shown, being attached to the shaft D, carrying the pulley E, which is connected by a belt to any suitable driving mechanism. Around the sprocket wheels C passes an endless sprocket chain F to which are attached cross pieces, or lugs, G, which perform the function of the ordinary buckets used in conveying shelled corn, wheat or other granular material. On each side of the sprocket chain and between that and the sides of the conveyer box, boards H are rigidly fixed, and over which are drawn the ears of corn by means of the chain F, with the cross pieces or lugs G attached, as will be readily understood.

I represents the feed hopper, which may be of any suitable size, and may be connected to any source of supply, and into which are fed the ears of corn, as clearly shown in Fig. 1. Directly in front of the hopper I, is located a partition J, which is rigidly attached to the outside casing of the conveyer and projects down into the same a short distance below its upper surface. Attached to this partition by means of two bolts K, is a valve L, which normally lies flat upon the partition J, and projects slightly below said partition and terminates in a flange, M, which embraces the lower edge of the partition. This valve and partition can be adjusted up or down so as to let only the required amount of ear corn pass thereunder by the lugs G on the chain F. It is held in position by the bolts, as stated, and said bolts are embraced each by a spiral spring N, the tension of which is regulated by thumb-nuts O. The purpose of this mechanism is to give a yielding pressure so as to enable the larger sized ears to pass.

Located on the upper side of the conveyer casing, and embracing the mechanism just described, is a box P, having a hinged cover Q, to enable the operator to gain access to said mechanism and regulate the tension of the valve springs.

R represents a pressure slide, which consists of a board located on the upper side of the conveyer case and adapted to slide loosely up and down, being held in place by means of cleats S, and corresponding cleats, not shown, located below the slide. It has a movement up and down of a few inches, and serves the purpose of confining the corn to a small space and preventing it from accumulating in the conveyer after passing through the automatic feed or falling back when the conveyer is set at a steep machine. It is essential when a great quantity of shelled corn is mixed with the ear corn, as it causes the corn to wedge together, and forces the shelled corn to travel with the ear corn.

T represents the conveyer head or coop, located at the upper end of the conveyer, and is provided with hinged doors to enable the operator to obtain ready access to the inside.

It is obvious that this conveyer can be employed wherever ear corn is to be conveyed, either from one receptacle to another or to an ordinary corn sheller. It obviates all the difficulties which have heretofore attended the conveyance, by mechanism, of ear corn from a lower to a higher elevation. It can be set at any angle, and will neither clog nor overflow; but conveys the corn in a steady stream to its destination.

Having thus described my invention, what I claim, and desire to secure by Letters Patent, is—

1. In an ear corn conveyer, the combination of the sprocket wheels, the endless chain, the cross bars and the bottom boards, with the sliding board R, substantially as and for the purpose described.

2. In an ear corn conveyer, the automatic feed regulating mechanism, comprising the partition or cut-off located in front of the feed hopper, the spring valve bearing upon said partition, and means for regulating the tension of the springs, substantially as set forth.

3. In an ear corn conveyer, the combination of means, substantially as described, for conveying the material, with the feed hopper above, and feeding directly upon, the conveying mechanism, the partition located immediately in front of the feed hopper, the valve L held in operative position by the bolts K and the spiral springs N, and being provided with the flange M, embracing the lower edge of said partition, substantially as and for the purpose described.

4. In an ear corn conveyer, the combination of the conveying mechanism constructed substantially as described, with the sliding board, located above said conveying mechanism, and adapted to regulate the thickness of the layer of material conveyed, substantially as set forth.

5. In an ear corn conveyer, the automatic regulating valve L, suspended on bolts K, attached to partition J, spiral springs N, tension nuts O, and the inclosing casing P, having the hinged lid Q for obtaining access to said mechanism, as and for the purpose set forth.

In testimony whereof I affix my signature in presence of two witnesses.

JEREMIAH S. BURKE.

Witnesses:
    LAND THORNE,
    CORY KITE.